No. 646,661. Patented Apr. 3, 1900.
H. HANSTEIN.
EDUCATIONAL APPLIANCE.
(Application filed July 15, 1897.)
(No Model.) 2 Sheets—Sheet 1.
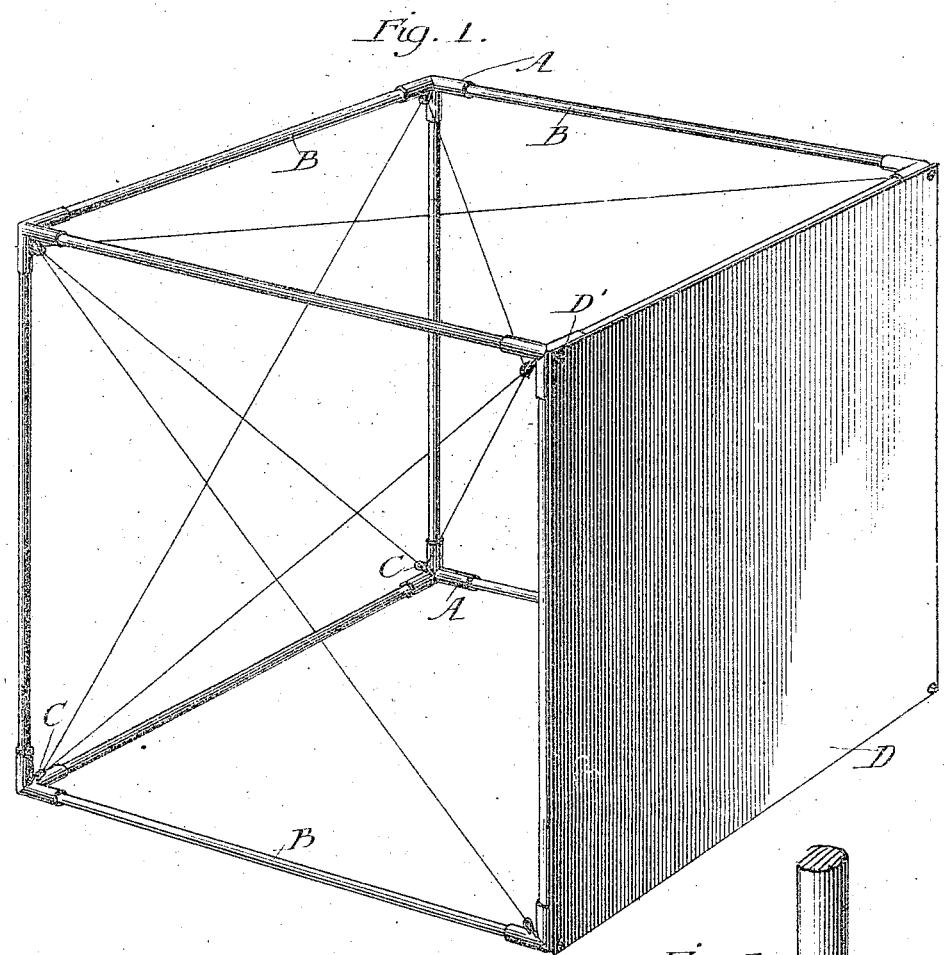
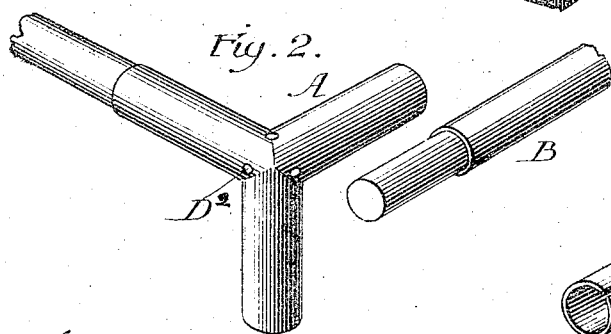
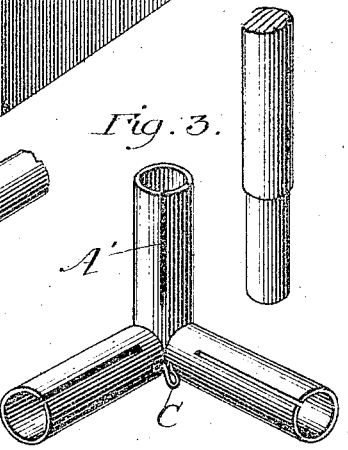
Witnesses:
Frank J. Blanchard
Donald M. Carter
Inventor
Hermann Hanstein
By Davis W. Parker,
Attorney.

No. 646,661. Patented Apr. 3, 1900.
H. HANSTEIN.
EDUCATIONAL APPLIANCE.
(Application filed July 15, 1897.)
(No Model.) 2 Sheets—Sheet 2.
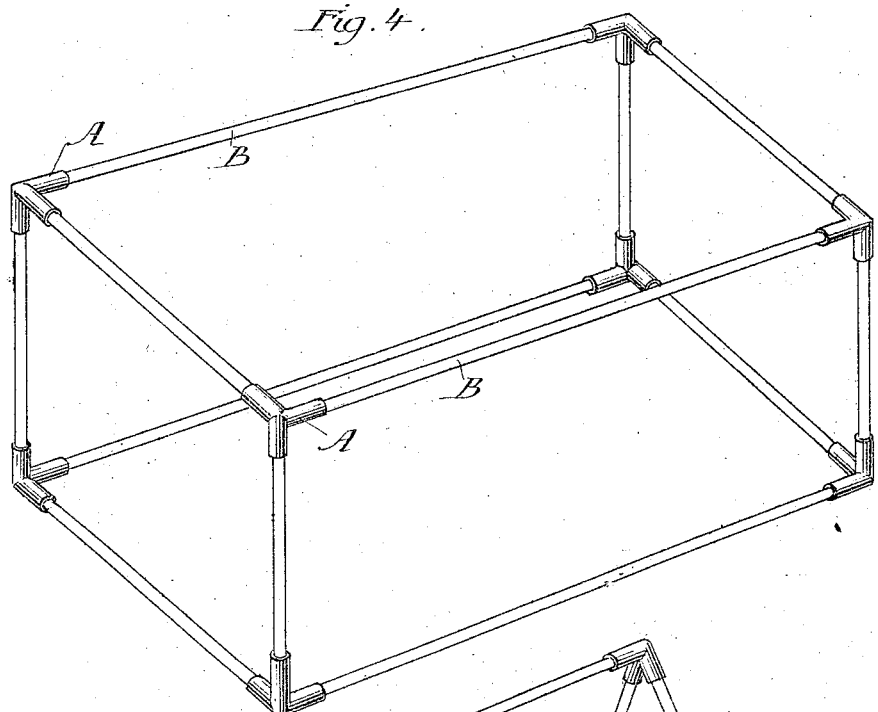
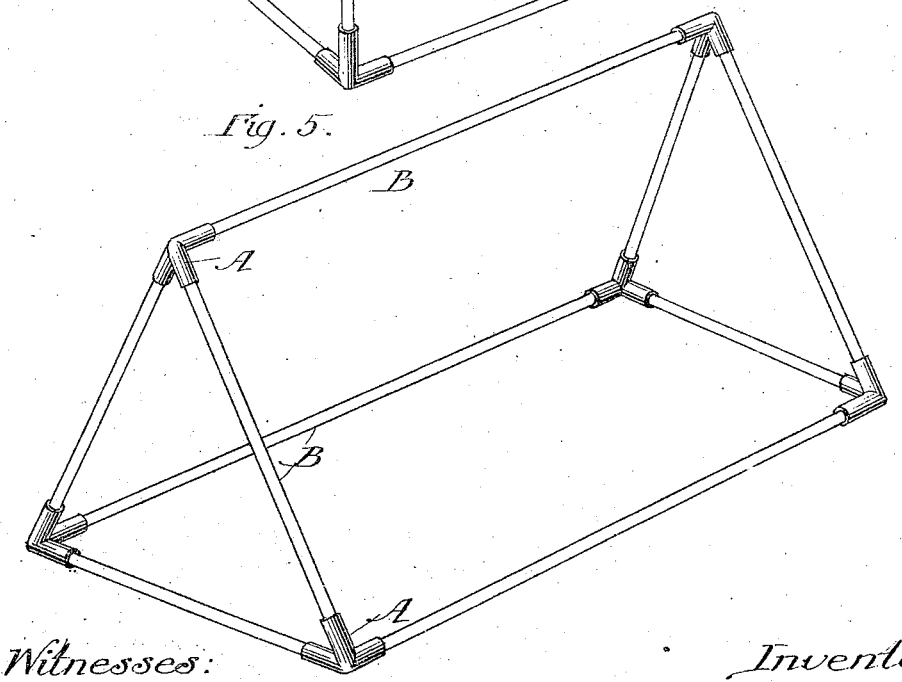

UNITED STATES PATENT OFFICE.

HERMANN HANSTEIN, OF CHICAGO, ILLINOIS.

EDUCATIONAL APPLIANCE.

SPECIFICATION forming part of Letters Patent No. 646,661, dated April 3, 1900.

Application filed July 15, 1897. Serial No. 644,609. (No model.)

*To all whom it may concern:*

Be it known that I, HERMANN HANSTEIN, a citizen of the United States, residing at Chicago, in the county of Cook and State of Illinois, have invented certain new and useful Improvements in Educational Appliances, of which the following is a specification.

My invention relates to educational appliances, and has for its object to provide a new and improved model or object to be used in schools or other places where instruction is given.

My invention is illustrated in the accompanying drawings, wherein—

Figure 1 is a perspective view of a figure embodying my invention. Fig. 2 is an enlarged detail of one of the corner-pieces. Fig. 3 is a view of the corner piece as seen from within the figure. Fig. 4 shows a different form of figure having the same corner-pieces as shown in Fig. 1. Fig. 5 shows a figure of a different species.

Like letters refer to like parts throughout the several figures.

My invention is particularly adapted for use in instruction in schools or the like where the use of a model will be beneficial—for example, in drawing or in explaining the characteristic features of figures of all descriptions, particularly those having three dimensions. When the device is used in connection with drawing, the pupil can have accurately presented to his eye any figure or body of three dimensions which he desires to reproduce upon a plain surface. He then receives the impression upon the retina of the thing or figure he is drawing, and hence will be free from the confusion and indefiniteness produced when he has, to guide him, only the representation upon a plain surface of the thing he is endeavoring to draw.

In Fig. 1 I have shown the outlines of a cube embodying my invention. This figure consists of the corner-pieces A, made of any material, preferably metal. In this construction the corner-pieces have three branches and are removably connected together by means of the pieces B. These pieces B may be made of any material, being preferably made of wood; but of course any other material may be used, if desired. If made of metal, they are preferably made hollow.

As shown in Figs. 2 and 3, the branches of the corner-pieces A are hollow and are slotted at A', so as to give them a spring action, the ends of the pieces B being inserted in the openings. The size and shape of the figure desired can be changed at will by changing the length of the pieces B. I may also provide the corner-pieces with the hooks C, to which may be attached cords or the like which are used to represent the diagonals and the like of the figure, as indicated. I may represent a solid figure by connecting to the corner-pieces the thin plates or side pieces D. These pieces may be of any material—for example, pasteboard. These pieces are connected to the corner-pieces by means of the screws D', which enter the openings $D^2$.

I have illustrated in Fig. 4 a rectangular figure of a different shape from that shown in Fig. 1, the same corner-pieces being used.

In Fig. 5 I have shown a figure which is triangular in cross-section. The only difference between the corner-piece of this figure and the corner-pieces of the rectangular figure is the difference in the angular relation of the branches of such corner-pieces.

It will be seen that I can form any figure desired and that when the corner-pieces for such figure are made the dimensions of the figure can be varied at will by varying the length of the pieces B. Instead of providing the corner-pieces with openings for the connecting-pieces I may provide the connecting-pieces B with the openings and have the branches of the corner-pieces enter such openings.

I have described these several parts in detail, so as to more clearly set forth my invention; but it is of course evident that the construction may be varied without departing from the spirit of my invention, and I therefore do not wish to be limited to the construction shown.

The use and operation of my invention are as follows: In making up any desired figure the corner-pieces belonging to such figure are obtained and then connected together by the connecting-pieces B. The parts can be separated to be shipped, and hence there is little danger of breakage, and they also occupy very little space. When it is desired to use the figure, the parts can be easily and quickly put together, so as to form the skeleton figure, which can be used for the purpose desired. Each set of corner-pieces may be provided with a series of connecting-pieces of different lengths, so that a variety of figures of different shapes or sizes may be produced by the use of the same corner-pieces. This figure when put together is very light and is substantially rigid, so that it can be supported in any position—as, for example, upon one corner without being sprung or bent out of shape. The figure can be held in any desired position, so as to indicate to the pupils how the figure when seen in that position should be represented upon a plain surface. When these figures are not in use, they can be taken apart, and hence will occupy very little space and danger of breakage is avoided. When the solid figure is desired, the skeleton figure can be covered by means of the thin plates or pieces D, and hence the same device will represent both the solid figure and the skeleton figure.

It will be seen that materials for a variety of figures can be had at a very little cost when this construction is used and that any solid figure can be represented by making the corner-pieces of the desired shape. In case the thin plates or pieces D become injured or soiled they can be easily and quickly replaced by new plates at a very little expense.

Many of the various applications of my invention readily suggest themselves. For example, it may be used in connection with the study of descriptive geometry or stereotomy, thereby giving an optical demonstration to the pupil of the various figures, sections, and the like. It will be readily seen that many of the difficulties arising in these studies may be easily and quickly removed by the use of my device, as it enables the pupil to be given an optical demonstration of things which have heretofore been left to the imagination.

Students are taught that lines have but one dimension—namely, length—and hence the connecting-pieces B are made circular in cross-section and of substantially the same size, so that all of the lines bounding the figure will be the same thickness regardless of the direction from which they are seen. By forming hooks between the branches of the corner-pieces and uniting these hooks by cords or the like the cords tend to hold the parts together and also form the diagonals of the figure. By this construction I am enabled to produce a complete figure for all educational purposes.

I claim—

1. A figure for educational purposes, comprising removable corner-pieces each provided with a suitable number of projecting branches circular in cross-section, a series of connecting-pieces adapted to be removably connected with the corner-pieces so as to form the outlines of a complete figure, a hook or engaging device associated with the several corner-pieces, a series of connecting-pieces connecting said engaging devices or hooks together and forming the diagonals and the like of the figure, the several parts so arranged as to form of themselves a complete figure adapted for exhibition purposes.

2. An educational device, comprising a series of corner-pieces provided with at least three branches each being slotted a portion of its length and having hooks attached at the junction of the branches, a series of connecting-pieces adapted to be removably connected with the branches of said corner-pieces, so as to form the bounding-lines of the figure, cords passing around said hooks and serving to hold the structure together, said cords also serving to define the diagonals of the figure.

3. A figure for educational purposes, comprising removable integral corner-pieces, each provided with a suitable number of projecting branches circular in cross-section and all of substantially the same diameter, said branches each provided with a circular opening extending part of the length thereof, a series of connecting-pieces also circular in cross-section and removably connected with said corner-pieces by being inserted in the circular openings therein, said connecting-pieces and corner-pieces assembled in a unitary structure so as to form of themselves the complete bounding-lines of a complete figure for exhibition purposes, said connecting-pieces all substantially of the same diameter so that all the bounding-lines of the figure will have the same thickness when the figure is held before the students in various positions, substantially as described.

HERMANN HANSTEIN.

Witnesses:
DONALD M. CARTER,
HOMER L. KRAFT.